United States Patent Office 3,134,209
Patented May 26, 1964

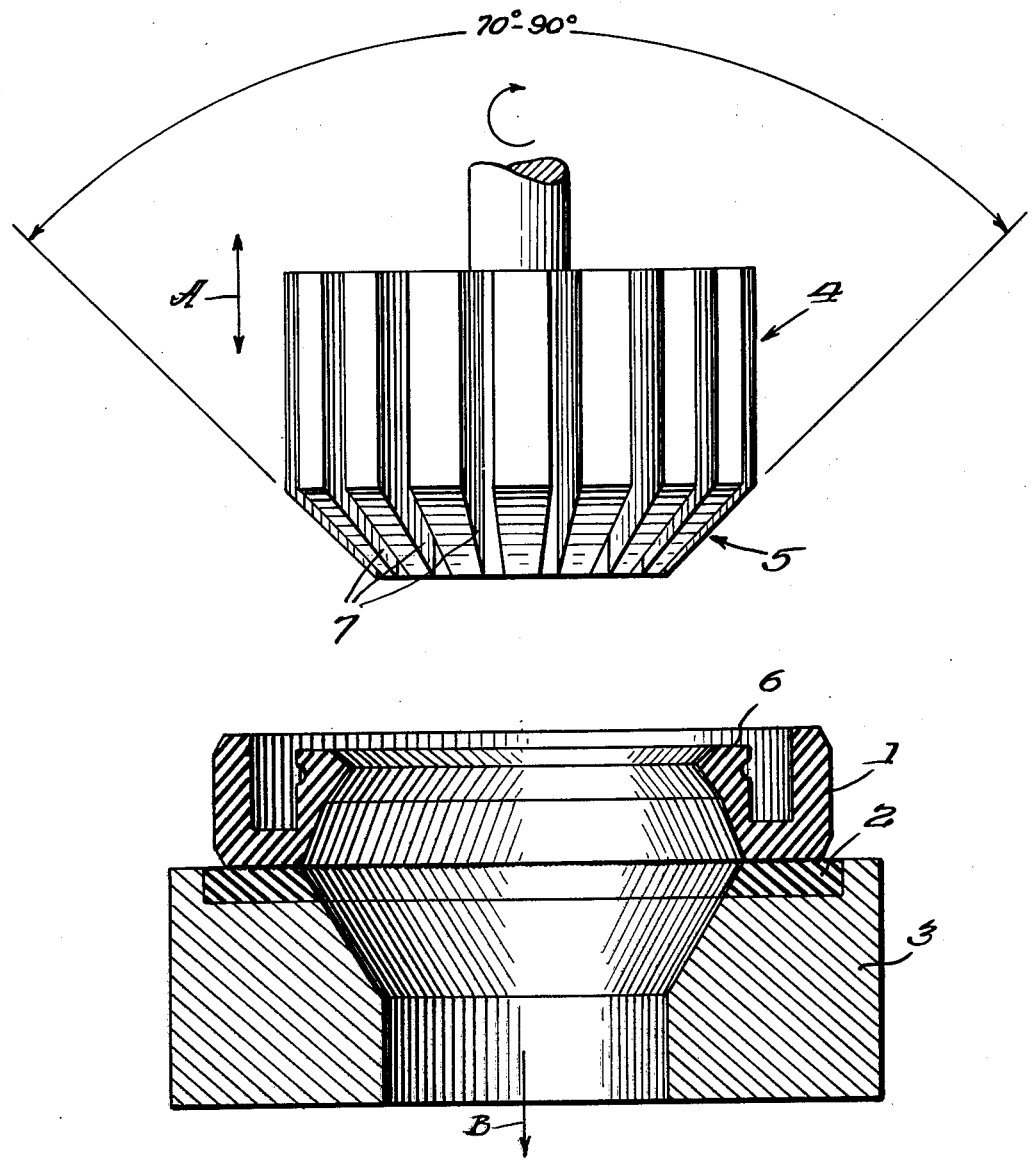

3,134,209
SHAPING THE END FACES OF SEALING LIPS OF SHAFT-SEALING RINGS
Arno Jansen, Bergisch-Neukirchen, Germany, assignor to Goetzewerke Friedrich Goetze Aktiengesellschaft, Burscheid, near Cologne, Germany, a corporation of Germany
Filed Mar. 21, 1963, Ser. No. 267,018
Claims priority, application Germany Mar. 24, 1962
3 Claims. (Cl. 51—290)

The invention disclosed herein is concerned with a method of angularly shaping the end face of the annular sealing lip of an elastic circular shaft-sealing ring.

The end faces of the sealing lips of elastic shaft-sealing rings were heretofore shaped with the aid of a cylindrical pin-like grinding tool of small diameter, which was moved in inclined position circularly along an annular sealing lip, in engagement therewith, while rotating about its own axis at a speed from 15–20 thousand r.p.m. Accordingly, this two-dimensional relative motion of the pin-like grinding tool requires high speed rotation thereof about its own axis and orbital motion thereof with respect to the sealing lip which is to be shaped or else, rotation of the corresponding shaft-sealing ring with respect to the pin-like grinding tool which rotates at high speed.

One disadvantage of this known method resides in that the sealing lip, which is to be shaped, yields to the pressure exerted thereon by the pin-like grinding tool during the initial positioning of such tool with respect to the lip, the material of the lip moving at the corresponding point laterally out of its circular shape. The consequent distortion of the sealing lip, no matter how slight it might be, may and does at times result in non-uniform shaping or grinding thereof. Defects of this kind are frequently responsible for faulty sealing action of shaft-sealing rings during the operation thereof. Another drawback resides in that automation of the production of such sealing rings can be effected only with the aid of very complicated and expensive constructions.

The invention proposes a method which avoids the above noted and other drawbacks experienced heretofore in the shaping of shaft-sealing rings and permits economical production and automation thereof.

According to the invention, the end face of the annular sealing lip of an elastic shaft-sealing ring is angularly shaped with the aid of a rotating circular grinding tool operating in the manner of a milling cutter, the grinding part of such tool being conically shaped at an angle corresponding to the angle at which the sealing lip is to extend in its final form, and effecting the angular grinding of the end face of the sealing lip throughout the annular extent thereof.

According to another feature of the invention, the shaft-sealing ring which is to be shaped, is placed upon a horizontally extending support which may include an elastic surface-roughened supporting member, and is centered upon such support or member by pressure exerted thereon by the grinding tool, thus avoiding the use of special centering means.

According to a further feature of the invention, suction is applied to hold the shaft-sealing ring during the grinding operation in centered position on the support.

The foregoing and further objects and features of the invention will appear from the description which is rendered below with reference to the accompanying drawing.

Referring now to the drawing, numeral 1 indicates in cross-sectional representation a shaft-sealing ring which is placed upon an elastic, surface roughened member 2 disposed in a depression formed in the part 3 of a suitable worktable. The shaping or grinding tool 4 is made of a material commonly used for grinding wheels, suitably Corundum and carbide, with a binder of synthetic material, and is disposed for rotation about its own axis and for displacement in vertical direction as indicated by the arrow A. Any suitable and approved means may be used for driving the tool 4 and for imparting thereto the desired displacement, such means being well known and commonly applied, for example, in connection with drill presses and milling machines. The tool is provided with a conical grinding portion 5 which extends at an angle from 70° to 90°.

The outer diameter of the grinding tool 4 corresponds at least to the largest diameter of end face of the sealing lip, so as to prevent dipping thereof into the interior of the lip. This is in contrast to the action of the previously used pin-like grinding tool which necessarily dipped into the interior of the sealing lip during the grinding thereof.

The peripheral speed of rotation of the grinding tool amounts during the grinding operation to about 20 meters per second, corresponding to 1500 to 9000 r.p.m. depending upon the diameter thereof.

The grinding tool is provided with grooves 7 formed in the cylindrical part and also in the conical part thereof. These grooves facilitate the grinding operation without excessive smearing, and also facilitate renewal of the grinding portion with the proper angle, to compensate for wear thereof.

The grinding tool is initially rotated about its own axis, at moderate speed, and is lowered axially until the grinding portion 5 engages the upwardly directed end face of the sealing lip 6. The sealing ring 1 will initially rotate with the grinding tool, thereby assuming a centered position, the downward pressure of the grinding portion 5 on the sealing lip 6 gradually increasing until a normal pressure prevails, at which the sealing ring will stand still, such operation being facilitated by the engagement of the sealing ring with the elastic surface-roughened support 2. The centering is greatly facilitated by the conical configuration of the grinding portion 5 at an angle from 70° to 90° Suction is now by means of a suitable blower (not shown) applied in the direction indicated by the arrow B. The sealing ring is now held against rotation by frictional engagement with the support 2 and by the action of the suction, and the grinding of the end face of the sealing lip can proceed.

The suction air is also effective to cool the parts and to remove particles ground off from the end face of the sealing lip 6, thus improving the grinding operation and the surface quality of the shaped end face of the sealing lip. The removal of grinding debris by the suction air also improves the working contitions for the personnel by substantially eliminating the formation of dust in the atmosphere.

The method according to the invention permits full automation of the production of shaft-sealing rings.

Changes may be made within the scope and spirit of the appended claims which define what is believed to be new and desired to have protected by Letters Patent.

I claim:
1. The method of angularly shaping part of the end face of the annular sealing lip of an elastic circular shaft-sealing ring, comprising the following steps, namely, placing upon a horizontally extending support a shaft-sealing ring with the annular sealing lip thereof, which is to be angularly shaped, facing upwardly, disposing above said support and the shaft-sealing ring thereon, for motion along a vertical axis, a grinding tool having a generally cylindrical body with an outer diameter corresponding at least to the largest diameter of the sealing lip of the sealing ring positioned upon said support and forming at the lower end thereof, which faces said sealing lip, a conical grinding portion extending at an angle at which the end face of said sealing ring is to be shaped, moving said grinding tool downwardly with the conical grinding portion thereof exerting a pressure on said sealing lip so as to center the corresponding shaft-sealing ring in its position on said support, applying suction to hold said shaft-sealing ring in its centered position on said support, and thereupon, while maintaining the suction, rotating and simultaneously downwardly moving said grinding tool with the conical grinding portion thereof in engagement with said sealing lip so as to grind a part of the end face angularly throughout the entire annular extent thereof, said suction being effective to hold said sealing ring in centered position during the grinding of the annular end face of the sealing lip thereof and to draw off particles removed by the grinding operation.

2. The method of angularly shaping part of the end face of the annular sealing lip of an elastic circular shaft-sealing ring, comprising the following steps, namely, placing upon a horizontally extending surface-roughened support a shaft-sealing ring with the annular sealing lip thereof, which is to be angularly shaped, facing upwardly, disposing above said support and the shaft-sealing ring thereon, for motion along a vertical axis, a grinding tool having a peripherally axially grooved generally cylindrical body with an outer diameter corresponding at least to the largest diameter of the sealing lip of the sealing ring positioned upon said support and forming at the lower end thereof, which faces said sealing lip, a likewise peripherally axially grooved conical grinding portion extending at an angle at which the end face of said sealing ring is to be shaped, moving said grinding tool downwardly with the conical grinding portion thereof exerting a pressure on said sealing lip so as to center the corresponding shaft-sealing ring in its position on said support, applying suction to hold said shaft-sealing ring in its centered position on said support, and thereupon, while maintaining the suction, rotating and simultaneously downwardly moving said grinding tool with the conical grinding portion thereof in engagement with said sealing lip so as to grind a part of the end face angularly throughout the entire annular extent thereof, said suction being effective to hold said sealing ring in centered position during the grinding of the annular end face of the sealing lip thereof and to draw off particles removed by the grinding operation.

3. The method of angularly shaping part of the end face of the annular sealing lip of an elastic circular shaft-sealing ring, comprising the following steps, namely, placing upon a horizontally extending surface-roughened support a shaft-sealing ring with the annular sealing lip thereof, which is to be angularly shaped, facing upwardly, disposing above said support and the shaft-sealing ring thereon, for motion along a vertical axis, a grinding tool having a peripherally axially grooved generally cylindrical body with an outer diameter corresponding at least to the largest diameter of the sealing lip of the sealing ring positioned upon said support and forming at the lower end thereof, which faces said sealing lip, a likewise peripherally axially grooved conical grinding portion extending at an angle between 70° to 90°, moving said grinding tool downwardly with the conical grinding portion thereof exerting a pressure on said sealing lip so as to center the corresponding shaft-sealing ring in its position on said support, applying suction to hold said shaft-sealing ring in its centered position on said support, and thereupon, while maintaining the suction, rotating said grinding tool with a peripheral speed of about 20 meters per second and simultaneously moving it axially downwardly with the conical grinding portion thereof in engagement with said sealing lip so as to grind a part of the end face angularly throughout the entire annular extent thereof, said suction being effective to hold said sealing ring in centered position during the grinding of the annular end face of the sealing lip thereof and to draw off particles removed by the grinding operation.

References Cited in the file of this patent
UNITED STATES PATENTS 2,690,218     Rosishow _____ Sept. 28, 1954